United States Patent
Smith et al.

[11] Patent Number: 5,804,077
[45] Date of Patent: Sep. 8, 1998

[54] INCREASING SETTLING RATE OF FINE SOLIDS IN OIL SAND TAILINGS

[76] Inventors: Russell G. Smith, 5807 - 94A Avenue, Edmonton Alberta, Canada, T6B 0Y7; Jonathan R. Spence, 17835 - 93 Street, Edmonton Alberta, Canada, T5Z 2H8

[21] Appl. No.: 700,682

[22] Filed: Aug. 16, 1996

Related U.S. Application Data

[63] Continuation-in-part of Ser. No. 578,385, Dec. 26, 1995, abandoned, which is a continuation of Ser. No. 395,833, Feb. 28, 1995, abandoned.

[51] Int. Cl.$^6$ ............................... C02F 1/52; B01D 21/01
[52] U.S. Cl. .......................... 210/702; 210/712; 210/803
[58] Field of Search ................... 210/702, 712, 210/803

[56] References Cited

U.S. PATENT DOCUMENTS

| | | |
|---|---|---|
| 4,225,433 | 9/1980 | Liu et al. ................................ 210/702 |
| 4,282,103 | 8/1981 | Fuhr et al. .............................. 210/709 |
| 4,414,117 | 11/1983 | Yong et al. ............................. 210/710 |
| 5,047,154 | 9/1991 | Comstock et al. ...................... 210/636 |

FOREIGN PATENT DOCUMENTS 1103184   6/1981   Canada .

*Primary Examiner*—Neil McCarthy
*Attorney, Agent, or Firm*—Millen, White, Zelano & Branigan, P.C.

[57] ABSTRACT

Calcium sulphate is added to desanded tailings derived from a hot water extraction process for recovering bitumen from oil sand. Enough calcium sulphate (100 to 200 ppm) is added to remove naphthenates and sulfonates from the aqueous phase. As a result, the settling rate of the fines in the tailings is accelerated.

3 Claims, 4 Drawing Sheets

OHWE PROCESS SETTLING RATE VS. MOBILITY

OHWE PROCESS SETTLING RATE VS. CALCIUM

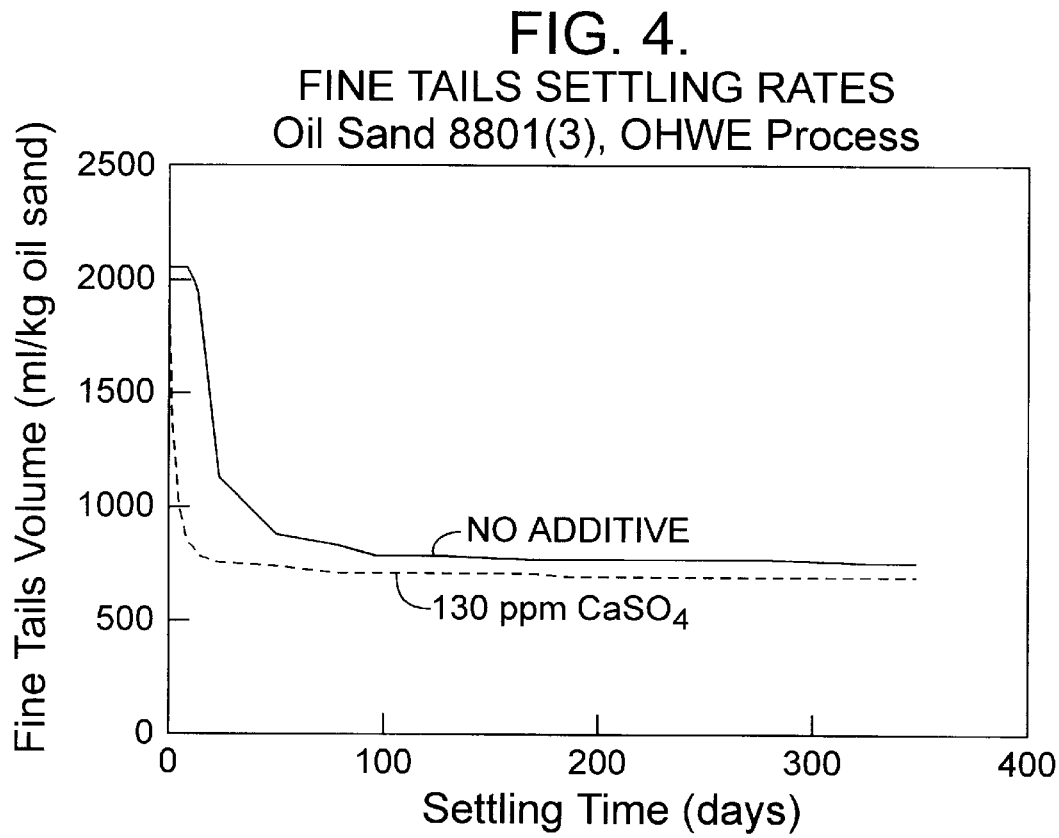
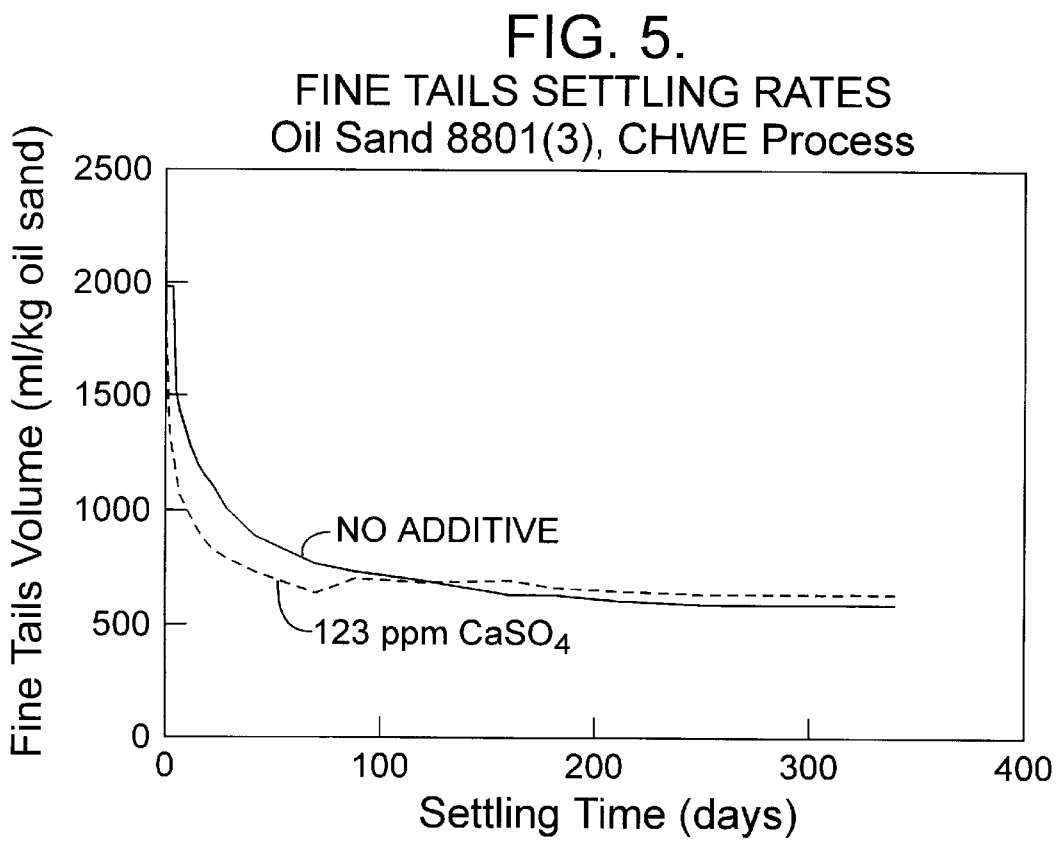

FINE TAILS SETTLING RATES
Oil Sand 8806, OHWE Process

FINE TAILS SETTLING RATES
Oil Sand 8806, CHWE Process

INCREASING SETTLING RATE OF FINE SOLIDS IN OIL SAND TAILINGS

CROSS-REFERENCE TO RELATED APPLICATION

This application is a continuation-in-part to U.S. application Ser. No. 08/578,385 filed Dec. 26, 1995, now abandoned, which is a continuation of application Ser. No. 08/395,833 filed on Feb. 28, 1995, now abandoned.

FIELD OF THE INVENTION

This invention relates to treatment of desanded aqueous tailings produced by a plant using a water-based extraction process to recover bitumen from oil sand. The treatment involves adding calcium sulphate to the desanded tailings to accelerate the settling rate of fine solids suspended in the tailings water.

BACKGROUND OF THE INVENTION

Oil sand comprises sand grains that are water wet. Bitumen, a form of oil, is present as a continuous matrix in which the coarse, wet, sand grains are embedded. Clay particles, referred to as "fines", are entrained in the very thin water sheaths encapsulating the sand grains. The fines will pass through a 22 mesh screen. They include minute particles, termed "ultrafines", which are less than 300 nanometers in diameter.

Oil sand is present as an enormous deposit in northern Alberta. This deposit is referred to as the Athabasca deposit.

The bitumen is extracted from the Athabasca oil sands by two large, commercial plants. One such plant is owned by the present assignees and processes about 350,000 tonnes of oil sand per day.

Applicant's plant uses what is referred to as the Clark hot water extraction ("CHWE") process, to separate and recover the bitumen from the oil sand. This process is described in detail in the literature. In broad outline, it involves:

Conditioning the oil sand by mixing it with hot water and a small amount of caustic in a rotating horizontal drum (termed a "tumbler"). Steam is sparged into the slurry to ensure that its exit temperature is about 80° C.

In the course of conditioning, the viscous bitumen is heated and is separated from the sand grains; it is released into the water phase in the form of minute flecks. At the same time, small air bubbles are entrained in the slurry. Fine bitumen flecks coalesce and form larger globules that contact and coat air bubbles, thereby becoming buoyant;

The product slurry leaves the tumbler and is screened, to remove oversize material;

The screened slurry is then diluted with additional hot water to produce a slurry containing about 50% solids by mass, based on the original oil sand feed;

The diluted slurry is retained in a large thickener-like vessel (called a "NPSV") for about 45 minutes. In this vessel, the aerated bitumen rises and is recovered as an overflow "primary" froth product. The sand settles and leaves the vessel as an underflow stream comprising water and some bitumen. In the mid-section of the PSV there exists a watery mixture comprising relatively non-buoyant bitumen and fines—this mixture is referred to as "middlings";

A stream of PSV middlings is mixed with PSV underflow and the mixture is introduced into a deep cone settler, referred to as the tailings oil recovery vessel ("TORV"). In the TORV, the feed mixture is deflected radially as it is fed in and is spread outwardly and horizontally. The out-moving mixture is contacted from below by an upwelling stream of aerated middlings. A secondary yield of froth is produced. The underflow from the TORV, comprising solids, water and some bitumen is discharged as a tailings stream;

A stream of middlings is with drawn from the TORV and is fed to a bank of sub-aerated flotation cells. Here the middlings are subjected to relatively intense aeration and mixing. Bitumen contained in the middlings is recovered in the form of a secondary froth. The underflow streams from the flotation cells are discharged as tailings;

The tailings from the TORV and flotation cells are combined to yield a stream referred to as "whole tailings". This stream typically comprises 0.5 wt. % bitumen, 44.9 wt. % water and 54.6 wt. % solids;

The whole tailings are, in part, discharged to a pond, which is enclosed by constructed dykes. More particularly, the whole tailings are discharged onto a sloping "beach" at one end of the pond. As the whole tailings fan out across the beach, most of the sand quickly settles out and joins the beach. In the course of this, some water and fines are trapped by the sand forming the beach. The remaining tailings, referred to herein as "desanded" tailings, join the pond contents. The other portion of whole tailings is discharged into a remote sand dump in which the sand settles out. The desanded tailings are then returned to the previously described pond. The desanded tailings typically comprise 0.6 wt. % bitumen, 85.4 wt. % water and 14 wt. % solids. The solids are typically less than 22 microns in size. The desanded tailings are fed in at one side of the pond and clarified water is recycled to the plant from the other end, for use as process water.

The desanded tailings settle very slowly to produce clarified tailings which can then be recycled to the process. Typically 1–2 years are required to reach the 50% settled point. Very large tailings settlings basins are required (applicants pond has an area of 12 km² and a depth of 45 m in the deepest portions).

If the rate of settling of the fines in desanded tailings can be significantly accelerated, then a smaller pond could be used.

It is known from Canadian patent No. 1,103,184, issued to Liu et al. and U.S. Pat. No. 4,282,103, issued to Fuhr and Liu, that the addition of CaO (300–700 ppm) to whole tailings causes the fines and coarse particles to agglomerate, resulting in the fines coming down mixed uniformly with the coarse particles to produce an agglomerate that can easily be filtered without danger of plugging the filter by fines. The amount of CaO preferably required is the amount needed to reduce the zeta potential of the fines particles to zero. For low fines ores the amount of CaO required is from 300–350 ppm, while for average fines ores the amount required was 800 ppm.

The process is costly, due to the large amount of calcium oxide used and the high capital and operating costs for filtration equipment.

It is also known from U.S. Pat. No. 4,414,117, issued to Yong et al, that the fines in desanded tailings can be made to settle quickly by removal of carbonate and bicarbonate ions from the system. The patentees assert that agents such as ion exchange resins, lime or other calcium compounds and mineral acids can be used to remove carbonates and bicarbonates from oil sand plant tailings. They further assert that, in the case of lime, an amount of 800 ppm is required for a tailings sample that contained 10.0 meq/L of carbonate plus bicarbonate.

Again, the process is costly due to the large amount of lime required. For applicants' plant, which produces tailings typically having 14.8 meq/L of carbonate plus bicarbonate, the calculated quantity of lime is 1184 ppm.

The invention described herein provides a process by which the fines in desanded tailings from oil sand plants can be made to settle quickly by the addition of 100–200 ppm of calcium sulphate.

SUMMARY OF THE INVENTION

The present invention arose from the discovery that tailings from oil sand plants contain dissolved surface active sodium naphthenates and sodium sulfonates at very low concentrations (10–15 ppm). Since surface active materials are known to be able to adsorb on clay particle surfaces to create high negative charges on the particles, it was hypothesized that the naphthenates and sulfonates in tailings were causing high negative charges in the fines which in turn were causing slow settling due to the repulsion between the negative charges.

Both naphthenates and sulfonates are known to form insoluble calcium compounds. Consequently it was hypothesized that the addition of calcium compounds to tailings should precipitate the naphthenates and sulfonates from the system and reduce the negative charge on the particles thus permitting fast settling. Since the naphthenates and sulfonates were present at only very low concentrations in tailings, it was further hypothesized that only very small amounts of calcium compounds would be required to achieve the desired result. Further, the calcium compound would need to be easily water soluble to be able to rapidly achieve the desired result without the need for thorough mixing. (Insoluble calcium compounds would be expected to react more slowly and require extensive mixing to react with the water soluble naphthenates and sulfonates.) Calcium sulphate and calcium chloride are the only cheap, readily available, water soluble calcium compounds and calcium sulphate is preferred over calcium chloride due to chloride corrosion problems.

On testing, it was found that the addition of 100–200 ppm of calcium sulphate to desanded tailings resulted in accelerated settling of the fines. There was no need to add calcium sulphate in sufficient quantity to remove all the carbonate and bicarbonate as in the Yong et al patent or to add enough calcium sulphate to reduce the zeta potential (here measured as the equivalent electrophoretic mobility) to zero as in the Liu et al patent. Nor was there any need to use the coarse sand as a filter media to bind the fine particles as in the Liu et al patent.

It was also discovered that when at least 100 ppm of calcium sulphate was added to desanded CHWE tailings, the tailings became easier to centrifuge to a cake suitable for disposal.

The invention has been stated in terms of a specified minimum amount of calcium compound added. It needs to be understood that oil sands recovered from different localities and depths of the huge Athabasca oil sand deposit vary significantly in nature and composition. We have determined that some of the added calcium reacts with naphthenates and sulfonates to form insoluble calcium salts. Also, some of the calcium reacts with a portion of the bicarbonates present in the pond and river water to also form insoluble calcium salts. The net result is that at least 100 ppm is needed as a minimum to remove the naphthenates and sulfonates. Usually this addition increases the concentration of calcium in the aqueous phase of the treated tailings by a small amount, typically to 3–7 ppm; this calcium concentration is a marker or indicator that an effective amount of calcium compound has been added, sufficient to produce a marked improvement in the settling rate of the fines. Due to the varying nature of the oil sand species, the calcium compound addition or dosage may have to be increased to, for example, 200 ppm, in order to get effective results. The appropriate dosage of calcium compound addition can be determined by testing the oil sand being processed in accordance with the examples described below.

DESCRIPTION OF THE DRAWINGS

Settling rate data in support of Examples I and II, are illustrated in FIGS. 1–3, 4–7 respectively. More specifically:

FIG. 4 illustrates comparative settling rates with and without the addition of 130 ppm of $CaSO_4$ to OHWE process tailings derived from 8801(3) oil sand;

FIG. 5 illustrates comparative settling rates with and without the addition of 123 ppm of $CaSO_4$ to CHWE process tailings derived from 8801(3) oil sand;

DESCRIPTION OF THE PREFERRED EMBODIMENT

Figure 1:
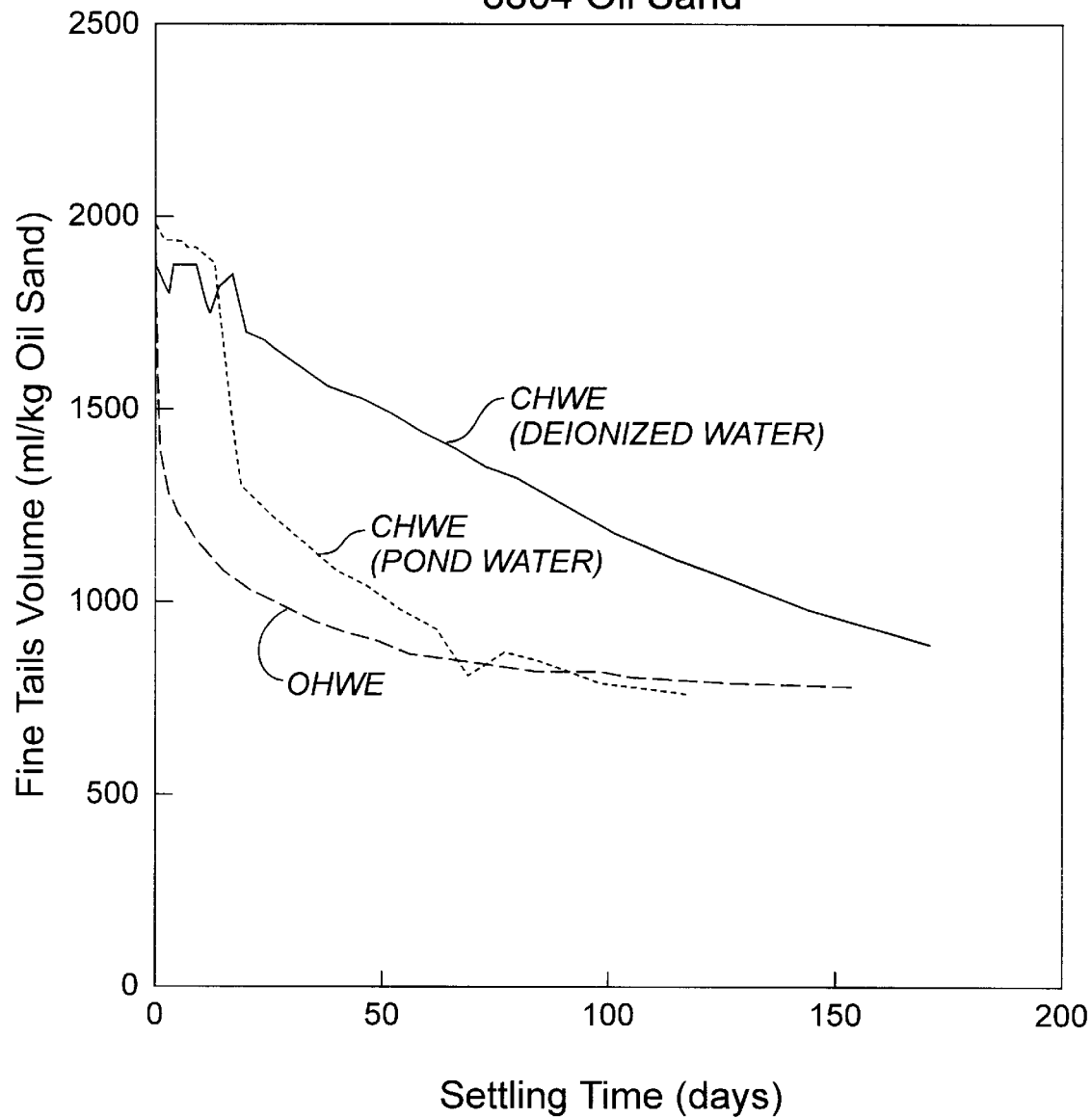
FIG. 1 illustrates fine tailings settling rates, over time, for OHWE and CHWE processes.

The invention is supported by the following examples.

EXAMPLE I

This example reports on tests carried out on tailings produced from a series of extraction runs performed on a group of different oil sands. Each run was carried out in the same laboratory scale test circuit, described below. Charges of each of the distinct oil sands were treated with each of the following processes:

the OSLO ("OHWE") process using river water;

the Clark ("CHWE") process using deionized water without use of NaOH process aid; and the Clark ("CHWE") process using tailings pond water from applicant's plant and 0.02 wt. % NaOH process aid.

The river water contained about 60 ppm of calcium ion (see Table I). The deionized water contained negligible calcium ion. The tailings pond water also contained very little calcium ion (5.5 ppm).

Assessment of the results from these tests established the following correlations:

that the fines present in the aqueous phase of desanded tailings were slow settling and the tailings were toxic when the electrophoretic mobility (equivalent to zeta potential of the tailings) was high and the calcium concentration in the aqueous phase was low;

that the fines were fast settling when the electrophoretic mobility was low and the calcium concentration was high; and that there was no correlation between total carbonate/bicarbonate concentration and settling rate.

The laboratory testing program produced units of product of about 1000 mL of desanded tailings. Samples of these tailings were placed in graduated cylinders and the position of the interface which developed as the tailings settled was followed over time. Tailings which were arbitrarily considered to be fast settling were observed to reach the half-way point in less than a day and to reach a final settled volume of about 30% in 30–60 days. Tailings which were considered to be slow settling required longer both to get to the 50% point and to the final 30% point (1 year). The time needed to get to the 50% point was used as a comparative measure of settling rates.

Electrophoretic mobility (equivalent to zeta potential) is a property indicative of the electrical charge on the particles. It was measured during the testing using a Rank Brothers Zeta meter[1].

[1] *trade mark

The tests were carried out on tailings produced in the course of bitumen extraction runs using a batch extraction unit referred to as the "BEU". This test unit was been described in Sanford, E. C. and Seyer, F. A., "Processibility of Athabasca tar sand using a batch extraction: the role of NaOH", Can. Inst. Mining and Metall., Bull., 72(803) pp 164–169 (1979).

The test unit comprised a jacketed reaction vessel having a capacity of about 1.5 L and being fitted with a stirrer, a system to introduce dispersed air bubbles near the bottom of the vessel and an outlet at the bottom of the vessel which could be opened to drain the whole tailings from the vessel.

To operate the CHWE process in this vessel, the vessel was charged with 150 mL of pond water at 80 ° C. or DI water at 80° C. and the appropriate amount of NaOH. The stirrer and air flow were started with water at 80° C. being pumped through the jacket of the vessel. Air was supplied at a rate of 150 ml/min. Oil sand (500 g) was then added and the resultant slurry stirred for 10 minutes. More water (pond or DI) (900 mL) was then added and the air flow was discontinued. The mixture was stirred for 10 minutes and the bitumen which floated during this time was collected. Air injection was then resumed for a further 5 minutes which caused more bitumen to float. This bitumen was also collected and the whole tailings were drained from the vessel. The whole tailings were allowed to stand for 1 minute during which time the sand settled and the desanded tailings were then decanted to a graduate cylinder.

To operate the OHWE process, the vessel was charged with 150 mL of river water at 80° C. and the appropriate amounts of kerosene and methyl isobutyl carbinol ("MIBC") were added. Oil sand (500 g) was then added and the resultant slurry stirred for 4 minutes with air flow (420 ml/min.). The heating bath was then turned off and the river water (900 g) at room temperature was added. The mixture was stirred for 10 minutes with a small air flow (rate 30 ml/min.) and the bitumen which floated during this time was then collected. The remaining material was stirred for a further 5 minutes with a higher air flow (rate 240 ml/min.) and the bitumen which floated was again collected. The whole tailings were drained from the vessel and allowed to stand for 1 minute to allow the sand to settle. The desanded tailings were then decanted to a graduated cylinder.

The relevant details of the extraction runs are described in Tables 2, 3and 4.

The whole tailings from each run were desanded by settling them for one minute and then pouring off the supernatant as desanded tailings.

Samples of the aqueous desanded tailings were then placed in graduated cylinders and periodically observed to determine how long it took to settle to the 50% point.

The concentration of calcium in the aqueous phase of the tailings was determined. This was done by ultra-filtering the tailings to remove insoluble clays and analysing the filtrate by inductively coupled plasma flame photometry.

The electrophoretic mobility of the fines in the aqueous phase of the desanded tailings was determined according to the method described by L. L. Schramm and R. G. Smith in the article "The Influence of natural surfactants on interfacial charges in the hot water process for recovering bitumen from the Athabasca oil sands", published in Colloids and Surfaces, 14 (1985) 67–85.

The total carbonate (carbonate plus bicarbonate) concentration in the aqueous phase of the tailings was measured by ultra-filtering the tailings to remove insoluble clays and analyzing the filtrate by titration with standardized hydrochloric acid.

Figure 2:
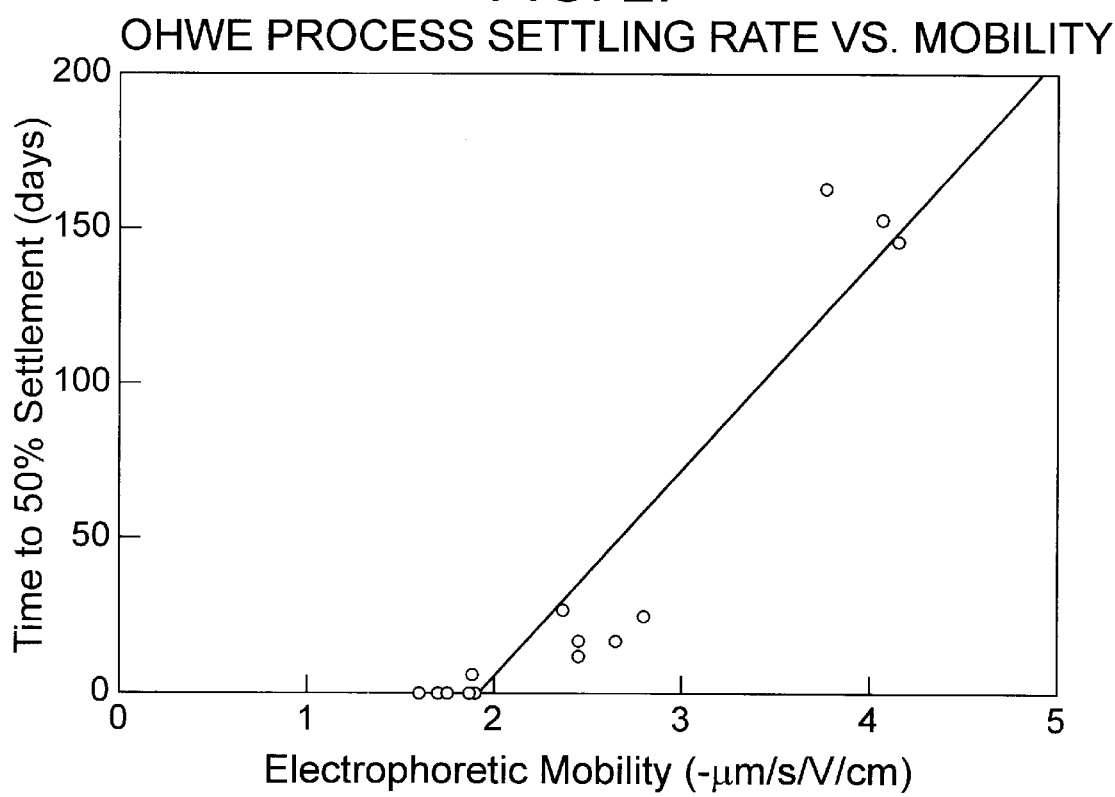
FIG. 2 illustrates the effects of electrophoretic mobility on OHWE process settling rate.
Figure 3:
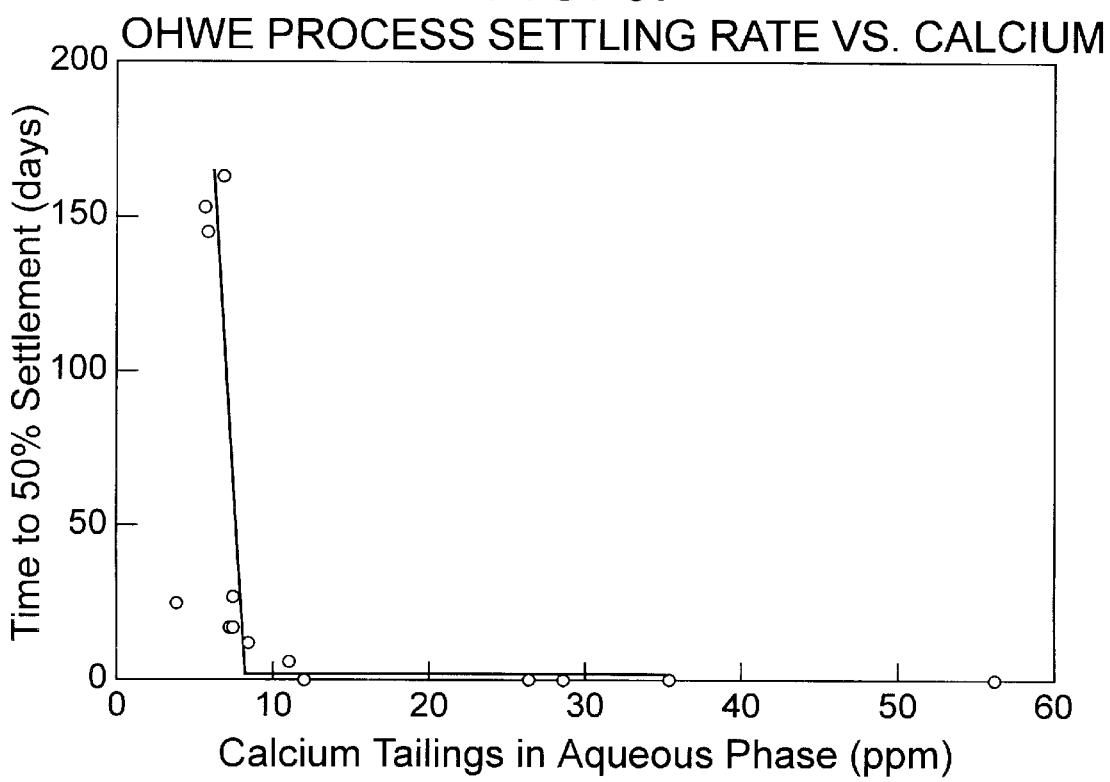
FIG. 3 illustrates the effect of calcium content on OHWE process settling rate.
Figure 6:
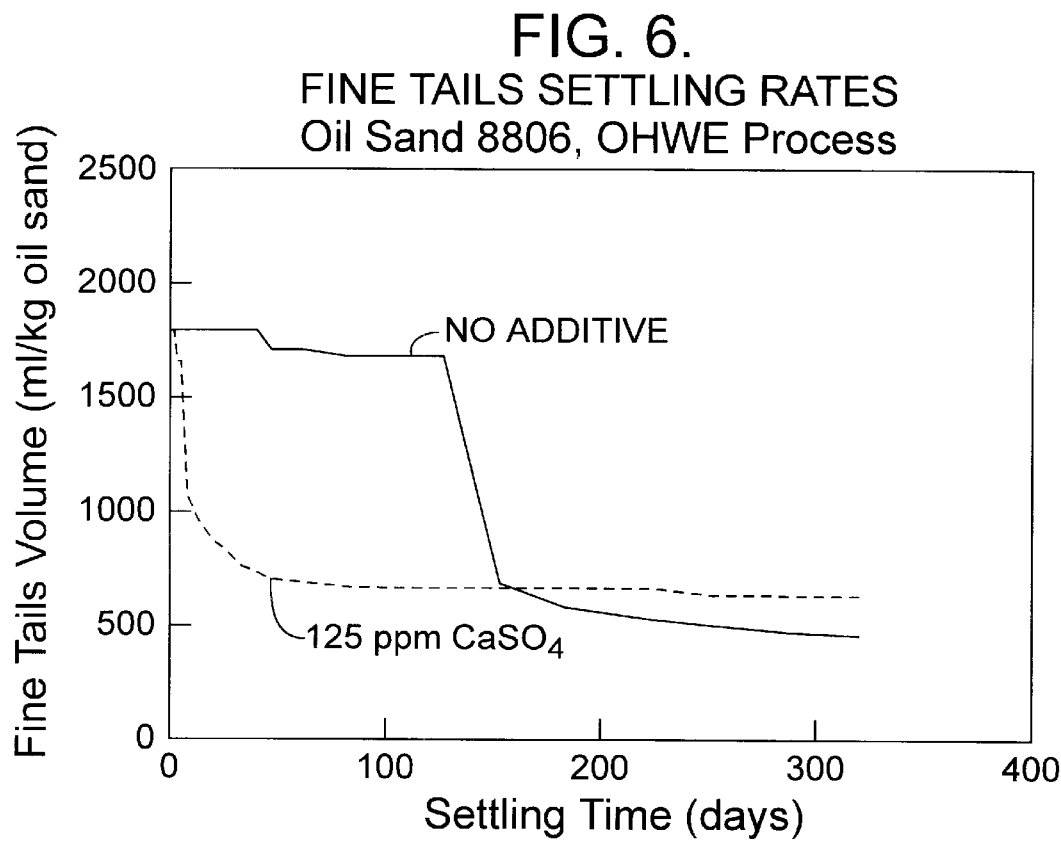
FIG. 6 illustrates comparative settling rates with and without the addition of 125 ppm of $CaSO_4$ to OHWE process tailings derived from 8806 oil sand.

The data from these runs is set forth in Tables 2–4 and FIGS. 1–3.

Settling curves were constructed from the measurements on the position of the interface in the settling cylinders vs. time and a typical set of settling curves is shown in FIG. 1. These curves were used to determine the time required for the tailings to settle to the 50% point and the data from the experiments are recorded in Tables 2–4. These tables also contain information about the experimental conditions for each experiment and also include electrophoretic mobility data and total carbonate concentrations.

The data indicated that, for the runs in which the oil sands were processed with the OHWE process, tailings samples characterized by an electrophoretic mobility below about −2 had fast settling fines while tailings having a mobility between about −2 and −4 had slow settling fines (see FIG. 2). In addition, tailings having a calcium content below about 7 ppm had slow settling fines, while tailings having a calcium concentration greater than about 7 ppm had fast settling fines (see FIG. 3). There was no correlation between settling rate and total carbonate concentration.

The data from the OHWE runs indicated that the results obtained depended on the oil sand used and the presence of calcium in the river water. If the produced tailings had calcium concentrations greater than about 7 ppm, the tailings were fast settling and of low charge. We hypothesize that such tailings are low in surface active materials due to the high concentration of calcium. If the produced tailings had calcium concentrations less than about 7 ppm, the tailings were slow settling and of high charge. We hypothesize that such tailings, being low in calcium, contain surface active materials.

The tailings from runs using the Clark process using NaOH (which is the process used commercially) were generally slow settling, highly charged and low in calcium. We hypothesize that these tailings are high in surface active materials generated by reaction between the NaOH and acid precursors in the oil sand.

The tailings from the Clark runs using DI water were sometimes slow settling, highly charged and low in calcium and sometimes fast settling, of low charge and high in calcium. We hypothesize that some oil sands can liberate surface active materials when slurried with DI water even if no NaOH is used.

Other oil sands when slurried with DI water do not liberate surface active materials.

EXAMPLE II

This example supports the following findings:

that addition to OHWE tailings of calcium sulphate in an amount of about 100 ppm was effective to convert the tailings from one in which the fines settled slowly to one in which they settled quickly; and that addition to CHWE tailings of calcium sulphate in an amount of about 175 ppm was effective to convert the tailings from one in which the fines settled slowly to one in which they settled quickly.

The experimental procedure used was as follows. Tailings from the BEU were drained into beakers and allowed to stand for one minute to settle the sand. The supernatant was decanted to a beaker and allowed to cool to room temperature (about 2 hours). The mixture was then stirred to mix any settled solids material and a sample (250 ml) was taken. A portion (50 ml) of this sample was used to determine % solids, a portion (100 ml) was centrifuged and some of the centrifugate was used for anion and cation analysis, while the rest of the centrifugate was ultra-filtered and used for cation analysis. Calcium sulphate hemihydrate was added as a crystalline solid to the remainder of the tailings and the mixture was stirred for one hour. A sample (100 ml) was removed and centrifuged with a portion of the centrifugate being used for anion/cation analysis and a portion being ultra-filtered and analyzed for cations. The remaining treated tailings were transferred to 1 L graduated cylinders which were sealed with sheets of polyfilm and stored at room temperature. An interface developed and the position of this interface was followed with time.

The measured data on the position of the interface with time for the experiments was used to plot settling curves and three of these are shown in FIGS. 4–7. The time required for the tailings to settle to the 50% point was determined for each experiment from these settling curves and the data is recorded in Tables 5 and 6. These Tables also contain information about the experimental conditions and Table 6 contains total carbonate concentrations and electrophoretic mobilities.

FIG. 4 and Table 5 show that addition of 130 ppm $CaSO_4$ to OHWE process tailings accelerated the time to get to the 50% settled point from about 35 days to about 9 days.

Treatment of CHWE process tailings derived from the same oil sand with 123 ppm $CaSO_4$ improved the time to get to the 50% settled point from about 29 days to 9 days. See FIG. 5 and Table 6.

Treatment of the OHWE tailings from oil sand 8806 with 125 ppm of calcium sulphate decreased the time required to get to the 50% settled point from 143 days to 11 days. See FIG. 6 and Table 5.

Figure 7:
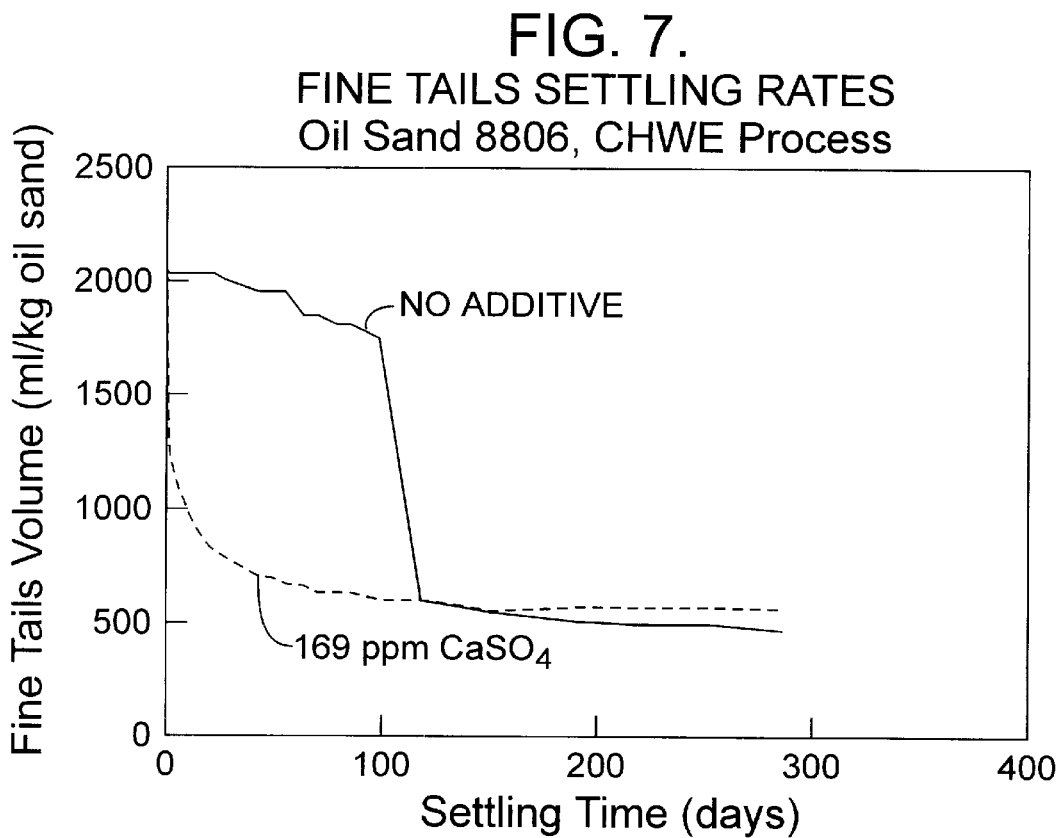
FIG. 7 illustrates comparative settling rates with and without the addition of 169 ppm of $CaSO_4$ to CHWE process tailings derived from 8806 oil sand.

Treatment of the CHWE process tailings from the same oil sand with 169 ppm of calcium sulphate reduced the time to get to the 50% settled point from 112 days to 9 days. This is shown in FIG. 7 and Table 6.

There was a very small reduction in total carbonate concentration on treatment of CHWE process tailings with calcium sulphate (Table 6) (for example from 15.97 meq/L to 15.43 meq/L for the 8801(3) oil sand). Evidently some of the added calcium sulphate is consumed by reaction with carbonate/bicarbonate. Clearly it is not necessary to remove the carbonate/bicarbonate to produce fast settling. Calcium sulphate caused a small reduction in electrophoretic mobility (and hence in zeta potential) but it was not necessary to reduce the zeta potential to zero.

EXAMPLE III

This example demonstrates that the fines in tailings treated with calcium sulphate are easier to consolidate with centrifugation than untreated fines.

More particularly, samples of treated desanded tailings and untreated desanded tailings were centrifuged in centrifuge tubes, starting at 1000 rpm for 30 minutes with measurement of light transmittance after centrifuging was complete. The tubes and samples were then re-centrifuged at 2000, 4000, 6000, 8000 and 10,000 rpm with measurement of light transmittance after each centrifugation.

The data from the tests are set forth in Table 7. The light transmittance data and visual inspection indicated that untreated tailings required about 10000 rpm to form a cake, while the treated tailings formed a cake at about 2000 rpm.

TABLE 1

WATER ANALYSIS

| Ion | River Water | Pond Water |
|---|---|---|
| Cl–, ppm | 14.3 | 136 |
| $SO_4^{2+}$, ppm | 37.5 | 215 |
| $HCO_3^-$, meq/L | 3.34 | 14.23 |
| $Mg^{2+}$ ppm | 17 | 4.1 |
| $Ca^{2+}$, ppm | 60.2 | 5.5 |
| pH | 7.7 | 8.6 |

TABLE 2

Experimental Data For OHWE Process With River Water

| Oil Sand | Oil Sand Bitumen Content (wt %) | Kerosene Amount (ppm) | MIBC Amount (ppm) | Secondary Tails Centrifugate Calcium (ppm) | Electrophoretic Mobility (um/s/V/cm) | Time to 50% Settled (days) | Total Carbonate meq/L |
|---|---|---|---|---|---|---|---|
| 8604(2) | 8.4 | 240 | 120 | 56.08 | –1.85 | <1 | 2.19 |
| 8801 | 9.6 | 240 | 120 | 8.71 | | 21 | 3.33 |
| 8801R | 9.6 | 240 | 120 | 10.85 | –1.88 | 6 | 3.68 |
| 8804 | 9.5 | 160 | 80 | 7.33 | –2.35 | 27 | 4.04 |
| 8812 | 11.5 | 60 | 30 | 3.74 | –2.79 | 25 | 3.48 |
| 8910 | 8.8 | 240 | 120 | 8.25 | –2.44 | 12 | 2.93 |
| 8806 | 8.1 | 240 | 120 | 5.72 | –4.16 | 146 | 2.81 |
| 8807 | 11.6 | 120 | 60 | 7.14 | –2.44 | 17 | 2.61 |
| 8901 | 8.9 | 240 | 120 | 5.57 | –4.07 | 153+ | 2.86 |
| 8907 | 9 | 240 | 120 | 6.84 | –3.77 | 163+ | 3.15 |
| 9009M | 7.8 | 280 | 140 | 7.34 | –2.64 | 17 | 3.24 |
| AL(TCS) | 15.2 | 80 | 30 | 35.28 | –1.68 | <1 | 2.69 |
| A(FCF) | 15.5 | 80 | 30 | 28.39 | –1.6 | <1 | 2.45 |
| B(TFS/RF) | 9.6 | 160 | 80 | 11.87 | –1.89 | <1 | 2.42 |
| D(FCC) | 11.4 | 120 | 60 | 26.34 | –1.74 | <1 | 2.77 |
| 9301 | 9 | 240 | 120 | 2.85 | | 70 | n/a |
| 9201 | 9.5 | 160 | 80 | 3.61 | | 70 | n/a |
| 9303 | 9.1 | 240 | 120 | 2.15 | | 105+ | n/a |

TABLE 3

Experimental Data for CHWE Process with Deionized Water

| Oil Sand | Oil Sand Bitumen Content (wt %) | NaOH Amount (wt %) | Secondary Tails Centrifugate Calcium (ppm) | Electrophoretic Mobility (um/s/V/cm) | Time to 50% Settled (days) | Total Carbonate meq/L |
|---|---|---|---|---|---|---|
| 8804 | 9.5 | 0.00 | 2.46 | −2.76 | 141 | 3.32 |
| 8801 | 9.6 | 0.00 | 6.16 | −1.68 | 26 | 3.00 |
| 8806 | 8.1 | 0.00 | 4.88 | −4.27 | 170+ | 2.87 |
| 8807 | 11.6 | 0.00 | 2.97 | −4.16 | 169+ | 2.06 |
| 8812 | 11.5 | 0.00 | 2.41 | −4.98 | 169+ | 1.36 |
| 8901 | 8.9 | 0.00 | 2.71 | −4.71 | 168+ | 1.96 |
| 8907 | 9 | 0.00 | 2.02 | −3.38 | 126 | 3.17 |
| 8910 | 8.8 | 0.00 | 3.15 | −2.78 | 47 | 2.44 |
| 8604(2) | 8.4 | 0.00 | 36.60 | −1.37 | <1 | 1.04 |
| 9009M | 7.8 | 0.00 | 2.45 | −4.09 | 169+ | 0.94 |
| D(FCC) | 11.4 | 0.00 | 1.70 | −4.40 | 162+ | 0.84 |
| A(FCF) | 15.5 | 0.00 | 0.64 | −4.63 | 159+ | 0.37 |
| A(TCS) | 15.2 | 0.00 | 0.83 | −4.18 | 162 | 0.35 |
| BL(TFS/RF) | 9.6 | 0.00 | 3.96 | −1.98 | 3 | 2.74 |

TABLE 4

Experimental Data for CHWE Process With Pond Water

| Oil Sand | Oil Sand Bitumen Content (wt %) | NaOH Amount (wt %) | Secondary Tails Centrifugate Calcium (ppm) | Electrophoretic Mobility (um/s/V/cm) | Time to 50% Settled (days) | Total Carbonate meq/L |
|---|---|---|---|---|---|---|
| 9009M | 7.8 | 0.02 | 2.39 | −2.64 | 31 | 15.87 |
| 8812 | 11.5 | 0.02 | 1.15 | −3.35 | 112 | 15.16 |
| 8806 | 8.1 | 0.02 | 2.89 | −3.26 | 114 | 16.62 |
| 8804 | 9.5 | 0.02 | 2.65 | −3.14 | 54 | 16.51 |
| 8907 | 11.6 | 0.02 | 3.00 | −3.14 | 117 | 16.36 |
| 8910 | 8.8 | 0.02 | 3.98 | −3.06 | 47 | 15.30 |
| 8807 | 11.6 | 0.02 | 1.92 | −3.14 | 39 | 16.25 |
| 8901 | 8.9 | 0.02 | 2.15 | −3.48 | 110+ | 16.21 |

TABLE 5

Experimental Data For Treatment of OHWE Tailings with Calcium Sulphate

| Oil Sand | Oil Sand Bitumen Content (wt %) | Kerosene Amount (ppm) | MIBC Amount (ppm) | CaSO$_4$.1/2H$_2$O Added To Tailings (ppm) | Time to 50% Settled (days) |
|---|---|---|---|---|---|
| 8801(3) | 8.9 | 240 | 120 | 0 | 35 |
| 8801(3) | 8.9 | 240 | 120 | 130 | 5 |
| 8801 | 9.6 | 240 | 120 | 0 | 20 |
| 8801 | 9.6 | 240 | 120 | 115 | 12 |
| 8801R | 9.6 | 240 | 120 | 0 | 8 |
| 8801R | 9.6 | 240 | 120 | 120 | 4 |
| 8804 | 9.5 | 160 | 80 | 0 | 27 |
| 8804 | 9.5 | 160 | 80 | 121 | 19 |
| 8806 | 8.1 | 240 | 120 | 0 | 143 |
| 8806 | 8.1 | 240 | 120 | 125 | 11 |
| 8807 | 11.6 | 120 | 60 | 0 | 17 |
| 8807 | 11.6 | 120 | 60 | 124 | 1 |
| 8812 | 11.5 | 120 | 60 | 0 | 24 |
| 8812 | 11.5 | 120 | 50 | 107 | 3 |
| 8901 | 8.9 | 240 | 120 | 0 | 206 |
| 8901 | 8.9 | 240 | 120 | 132 | 8 |
| 8907 | 9 | 240 | 120 | 0 | 179 |
| 8907 | 9 | 240 | 120 | 115 | 29 |
| 8910 | 8.8 | 240 | 120 | 0 | 13 |
| 8910 | 8.8 | 240 | 120 | 123 | 13 |
| 9009M | 7.8 | 280 | 140 | 0 | 18 |
| 9009M | 7.8 | 280 | 140 | 118 | 11 |

TABLE 6

Experimental Data For Treatment of CHWE Tailings With Calcium Sulphate

| Oil Sand | Oil Sand Bitumen Content (wt %) | NaOH Amount (ppm) | CaSO$_4$.1/2H$_2$O Added To Tailings (ppm) | Secondary Tails Centrifugate Calcium (ppm) | Time to 50% Settled (days) | Electrophoretic Mobility um/s/v/cm | Total Carbonate meq/L |
|---|---|---|---|---|---|---|---|
| 8801(3) | 8.9 | 0.02 | 0 | | 29 | | 15.97 |
| 8801(3) | 8.9 | 0.02 | 123 | | 9 | | 15.43 |
| 8804 | 9.5 | 0.02 | 0 | 3.7 | 52 | −2.76 | 16.51 |
| 8804 | 9.5 | 0.02 | 175 | 3.9 | 8 | −2.92 | 15.43 |
| 8806 | 8.1 | 0.02 | 0 | 5.8 | 112 | −3.26 | 16.61 |
| 8806 | 8.1 | 0.02 | 169 | 4.5 | 9 | −2.85 | 14.32 |
| 8807 | 11.6 | 0.02 | 0 | 4.2 | 37 | −2.76 | 16.25 |
| 8807 | 11.6 | 0.02 | 166 | 3.7 | 2 | −2.55 | 14.93 |
| 8812 | 11.5 | 0.02 | 0 | 4.6 | 116 | −3.35 | 15.16 |
| 8812 | 11.5 | 0.02 | 157 | 3.6 | 4 | −2.66 | 13.21 |
| 8901 | 8.9 | 0.02 | 0 | 5.4 | 127 | −3.48 | 16.21 |
| 8901 | 8.9 | 0.02 | 173 | 5 | 8 | −2.84 | 15.29 |
| 8907 | 9 | 0.02 | 0 | 3.5 | 121 | −3.14 | 16.36 |
| 8907 | 9 | 0.02 | 177 | 4 | 73 | −2.83 | 15.90 |
| 8910 | 8.8 | 0.02 | 0 | 3.4 | 44 | −3.06 | 15.30 |
| 8910 | 8.8 | 0.02 | 175 | 3.6 | 44 | −2.76 | 14.80 |
| 9009M | 7.8 | 0.02 | 0 | 6 | 32 | −2.64 | 15.87 |
| 9009M | 7.8 | 0.02 | 161 | 4.8 | 8 | −2.72 | 12.73 |

TABLE 7

Centrifugation of CHWE Tailings With and Without Calcium Sulphate Treatment

| | | Light Transmittance | |
|---|---|---|---|
| Oil Sand | RPM | Untreated Tailings | Treated Tailings |
| 8806 | 1000 | 0.5 | 0.6 |
| 8806 | 2000 | 0.5 | 16.1 |
| 8806 | 4000 | 0.5 | 65.9 |
| 8806 | 6000 | 0.5 | 71.3 |
| 8806 | 8000 | 0.5 | 89 |
| 8806 | 10000 | 26.9 | 88.1 |

The embodiments of the invention in which an exclusive property or privilege is claimed are defined as follows:

1. A method for treating whole aqueous tailings, produced by a water-based extraction process to recover bitumen from oil sand, said tailings containing suspended coarse sand and clay fines, comprising:
   desanding the whole tailings by settling out substantially all of the sand to yield desanded tailings;
   adding about 100 to 200 ppm of calcium sulphate to the desanded tailings;
   settling the mixture to produce clarified water and sludge; and
   recycling the clarified water to the plant as process water.

2. The method as set forth in claim 1 wherein the calcium sulfate is added in an amount sufficient to increase the calcium concentration in the aqueous phase to at least about 3 ppm.

3. The method as set forth in claim 2 wherein:
   the whole tailings have been produced by the Clark hot water extraction process and about 100 to 200 ppm of calcium sulphate are added to the desanded tailings.

* * * * *